(No Model.) J. SCHEUERECKER. 2 Sheets—Sheet 2.
APPARATUS FOR MANUFACTURING ICE AND FOR REFRIGERATING.
No. 518,791. Patented Apr. 24, 1894.
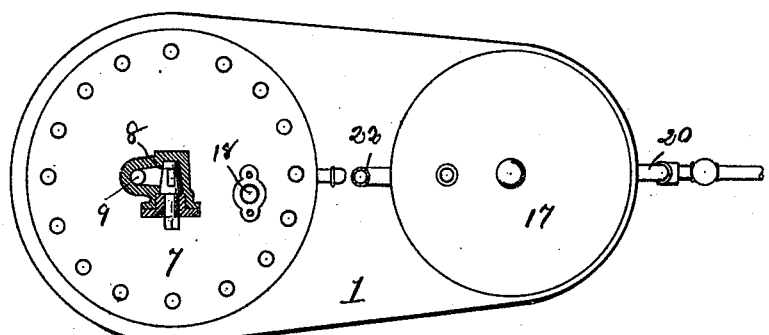
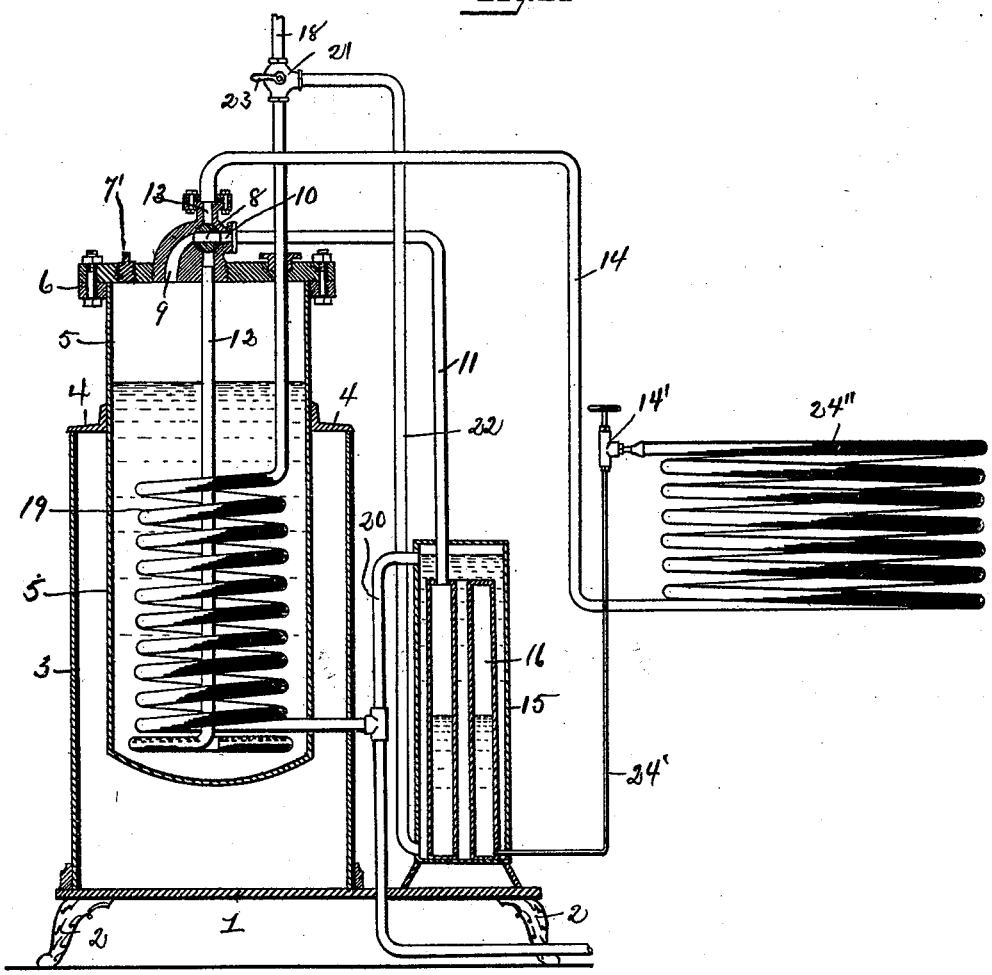
WITNESSES.
Carroll J. Webster
Floyd R. Webster
INVENTOR.
Joseph Scheuerecker
By William Webster
Atty.

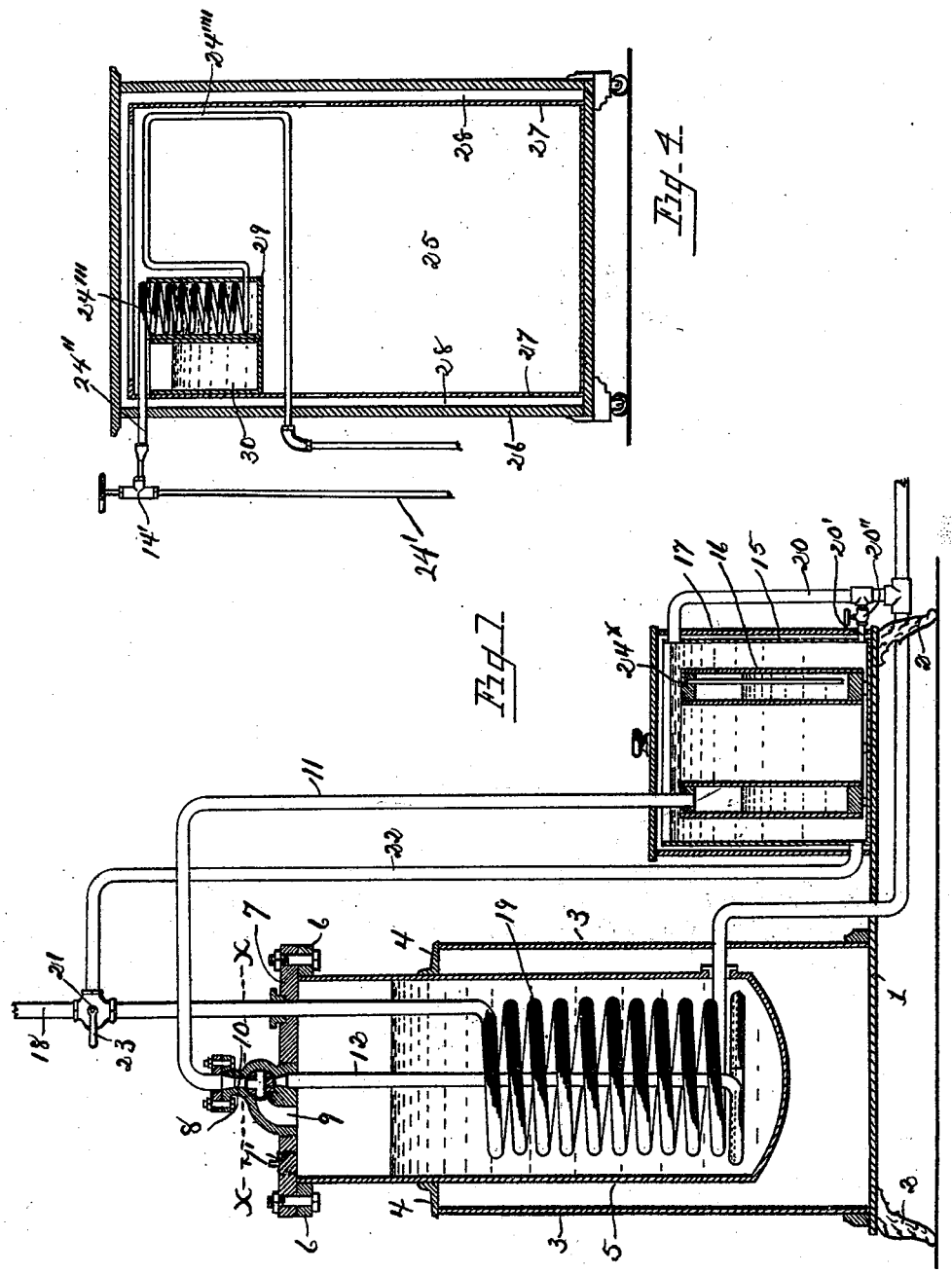

UNITED STATES PATENT OFFICE.

JOSEPH SCHEUERECKER, OF INDIANAPOLIS, INDIANA, ASSIGNOR OF SEVEN-EIGHTHS TO W. A. MILES AND O. H. PERRY, OF COLUMBUS, OHIO, E. E. PERRY, OF INDIANAPOLIS, INDIANA, AND JOHN W. HAHN, OF TOLEDO, OHIO.

APPARATUS FOR MANUFACTURING ICE AND FOR REFRIGERATING.

SPECIFICATION forming part of Letters Patent No. 518,791, dated April 24, 1894.

Application filed November 5, 1892. Serial No. 451,040. (No model.)

*To all whom it may concern:*

Be it known that I, JOSEPH SCHEUERECKER, of Indianapolis, county of Marion, and State of Indiana, have invented certain new and useful Improvements in Apparatus for Manufacturing Ice and for Refrigerating Purposes; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an apparatus for manufacturing ice, and for refrigerating purposes, and has relation to an apparatus in which a volatile liquid, such as liquid ammonia, is employed to produce a freezing or cooling temperature by releasing the gases from the liquid ammonia by heat, condensing by cold furnished by water, and consequently causing liquefaction, cold, and evaporation, which again changes the liquid to a gas, lowering the temperature to the requisite freezing point desired, whereby ice may be manufactured, or the necessary apparatus for refrigerating purposes supplied with cold, or by which both processes may be carried on at the same time, the gases then passing through the water remaining from the original ammonia, are absorbed and form the original ammonia water ready for repeated operations.

The object of the invention is to provide for the return of the ammonia gases for repeated use by means of a simple mechanism devoid of complication, capable of being understood and operated by unskilled domestics.

A further object is to produce an apparatus for the purposes named that can be constructed at slight expense for domestic use or commercial purposes.

The invention consists in the parts and combination of parts shown in the drawings, described in the specification and pointed out in the claim.

Heretofore devices of this character have been constructed, but owing to the multiplicity of parts employed, entail great expense in manufacturing and consequently require mechanical skill to operate the same. I have aimed to overcome this objection by producing an apparatus adaptable for domestic use as in private houses, or for hotels, salesrooms, butchers or dealers in perishable goods which can be constructed at a cost to insure its adoption and with convenience of management that shall allow of intrusting its care to the ordinary domestic. In the accomplishment of these objects I employ a three way cock, in an apparatus for manufacturing ice alone and a four way cock for an apparatus for refrigerating purposes or for manufacturing ice and refrigeration combined, and dispense with the use of several valves or check valves.

In the drawings: Figure 1 is a longitudinal vertical section of the still, furnace and ice freezing chamber, illustrating the three way cock and communication therefrom. Fig. 2 is a plan view of the same on lines X—X, Fig. 1, whereby the three way cock is shown in section. Fig. 3 is a longitudinal vertical sectional view of the apparatus when used for refrigerating, illustrating the four way cock and communications therefrom. Fig. 4 is a sectional elevation of the portion of the apparatus employed to both freeze and refrigerate, the same being incorporated in an ice chest or refrigerator, the still, furnace, and condensing chamber being omitted and only a portion of the pipes that lead thereto being shown.

1 designates a metal base plate, supported upon legs 2, and upon which all of the operative parts of the apparatus are sustained. Upon the base plate is secured a drum 3 having an annular top piece 4 into which is suspended a steel boiler 5 having an annular flange 6 secured thereon at the upper end to which a head 7 is firmly bolted. In head 7 is screwed a casing 8, in which is a three way cock when the apparatus is used as an ice machine, and a four way cock when it is used for refrigerating purposes or for combined ice and refrigerating purposes, there being a passage way 9 in the same leading to the boiler, and a passage way 10 in which is secured a pipe 11 leading to the cooling or storage tank, there also being a passage way leading from the cock to a pipe 12 leading into the boiler to near the bottom of the same where it is coiled and perforated, and in the apparatus for freezing or refrigerating, there is a passage way 13 communicating with pipe 14 which returns the gases from the freezing and refrigerating coils back into the boiler.

15 designates the cooling chamber surrounding the annular concentric receptacle or storage tank 16 for the cooling medium, closed at both ends and water tight, this receptacle being slightly raised from the bottom of the cooling chamber to allow a free circulation of water around the receptacle, the cooling chamber being insulated from atmospheric contact by a covering 17 inclosing the same.

In the use of the apparatus as a refrigerator or for freezing and refrigerating, as the cooling medium is led from the storage tank to the place of use, for refrigerating, or for refrigerating and freezing, the cover is omitted.

18 designates a pipe in communication with a water supply and extending into the boiler, a lower portion being coiled as at 19, turned at right angles at the bottom, and extending through the boiler and drum and is connected with an overflow pipe 20 tapped into the cooling chamber 15.

At 21 there is a union upon pipe 18 into which a pipe 22 is secured which enters the receptacle 15, a cock 23 in the union controlling the admission of water into the boiler or cooling receptacle.

24 designates a vent plug screwed into the top of receptacle 16.

20' designates a draw off pipe connecting overflow pipe 20 and cooling chamber 15, which is supplied with a valve 20'' by which to draw off the water in the cooling chamber. In the use of the apparatus for refrigeration, or freezing ice and refrigeration, the draw off cock 20'' is dispensed with.

24' designates a pipe leading from the storage tank 16, to a coil 24'' which is designed to be either placed in a room to be cooled, or in a refrigerator 25 to cool the same, or in a refrigerator to both manufacture ice and cool the same.

In Fig. 4 I have illustrated a preferred form of refrigerator, which has an outer and inner wall 26 and 27 respectively, leaving an air space 28 in which the air in the refrigerator circulates, there being an ice box 29 and a water box 30. Coil 24'' in this construction is formed with a freezing coil 24''' in the ice box 27 and a coil 24'''' in the refrigerator, preferably near the top, as the warm air after being cooled falls, and warmer air from below rises keeping a circulation of the air, so as to keep the same in contact with the freezing coil, thereby keeping an even cool temperature in the refrigerator.

In operation, when using the apparatus for the manufacture of ice, a quantity of aqua ammonia is introduced into the boiler through an opening in the head closed by screw plug 7', a fire is built in the drum 3 and the aqua ammonia heated to a degree to release the ammoniacal gas, the stem of the three way cock is turned to allow the gas to find exit through way 9 and into pipe 11 and into the storage tank 16, screw plug $24^{\times}$ therein is removed to give the air vent, until it is all removed when the plug is screwed to place. At the same time the fire is started under the boiler, cock 23 is turned so that the water flows through pipe 22 into the cooling chamber 15, which cools the hot gas received in the storage receptacle 16 as it comes from the boiler and in connection with the pressure liquefies the gas. The water after being heated by contact with the hot gas conduits flows off through overflow pipe 20. When all the gases are driven off from the aqua ammonia, therefore leaving only water in the boiler, the fire is extinguished, cock 23 turned to cause the water to flow through pipe 18 and coil 19 thus cooling the boiler and thereby lessening the pressure in the same. Cock 20'' is now opened and the water in the cooling chamber is all drawn off, and an annular pan is filled with water and inserted around the storage tank 16 and a circular can is inserted in the space embraced by the storage tank. The stem of the three way cock is now turned so that the pipes 11 and 12 are in communication, and the liquid ammonia now begins to evaporate, the pressure in the boiler being removed as described, and flows through pipes 11 and 12 and through the perforations in the bottom of pipe 12, where it is absorbed by the water remaining in the boiler and produces the original aqua ammonia. As the process of evaporation takes place or as the liquid is changed to a gas it becomes intensely cold and absorbs heat from everything thus freezing the water in the cans and forming ice, the cans are now removed, the ice taken therefrom, and the apparatus is ready for another like operation.

If the apparatus is used for refrigerating or cooling purposes, the operation is the same as just described only a return pipe 14 being used from the refrigerating coil, instead of the pipe 11 which necessitates another passage way for the cock making it a four way cock, there being an expansion valve 14' by which to control the temperature of the coil, and if the apparatus is used for refrigeration and freezing ice it is the same as for refrigeration. In this instance the freezing coil being in water will freeze the water making ice and the refrigerating coil will cool the atmosphere in contact therewith.

It will be apparent that I can have several coils in different places, for cooling, or freezing ice, and that I do not limit myself to any form of refrigerator or cooling chamber.

In places where steam is used it is obvious that the gas may be generated by steam and in this instance I connect pipe 18 with the steam pipe as well as the water pipe, and dispense with drum 3.

It will be seen that the apparatus is adaptable to a construction that is portable, and convenient for family use, or capable of a construction for fixed use in a mercantile business, or for manufacturing ice for the trade, the greatest claim herein being to economy of construction, ease of management and adaptability to all uses.

What I claim is—

In an ice machine a furnace, a still located therein, a cover for said still, a casing arranged in the cover, a multiplex cock arranged in the casing, a water tank, a cooling receptacle or condenser located in said water tank, a pipe leading from the casing to the cooling receptacle, a pipe leading into the still and coiled and perforated at the bottom, a water pipe passing through the still and coiled about the perforated pipe, an over flow or discharge pipe leading from the water tank and communicating with the water pipe after passing through the still, and a water pipe leading into the water tank.

In testimony that I claim the foregoing as my own I hereby affix my signature in presence of two witnesses.

JOSEPH SCHEUERECKER.

Witnesses:
A. W. THOMSON,
S. B. LOVELESS.